United States Patent [19]

Chatterjee et al.

[11] 3,723,413
[45] Mar. 27, 1973

[54] WATER-INSOLUBLE FLUID-ABSORPTIVE AND RETENTIVE MATERIALS AND METHODS OF MAKING THE SAME

[75] Inventors: Pronoy K. Chatterjee, Spotswood; Michael C. Kwok, Princeton, both of N.J.

[73] Assignee: Personal Products Company, Milltown, N.J.

[22] Filed: Oct. 26, 1970

[21] Appl. No.: 84,129

[52] U.S. Cl. .................... 260/232, 128/285, 260/13, 260/17 R, 260/231 CM
[51] Int. Cl. ..................... C08b 11/00, C08b 11/20
[58] Field of Search .................. 260/231 CM, 232; 106/197 C

[56] References Cited

UNITED STATES PATENTS

| | | | |
|---|---|---|---|
| 2,060,056 | 11/1936 | Ellsworth | 260/231 |
| 2,486,805 | 11/1949 | Seymour et al. | 128/287 |
| 2,639,239 | 5/1953 | Elliott | 106/197 |
| 3,342,805 | 9/1967 | Callihan | 260/232 |
| 3,379,721 | 4/1968 | Reid | 260/232 |

Primary Examiner—Donald E. Czaja
Assistant Examiner—Ronald W. Griffin
Attorney—Alexander T. Kardos, W. Frederick Mayer and Robert L. Minier

[57] ABSTRACT

Water-insoluble, fluid-absorptive and retentive carboxyalkylated cellulosic materials having an average degree of substitution greater than 0.35 and up to about 1.4 or more carboxyalkyl radicals per anhydroglucose unit in the cellulose and methods of making the same which comprise: (1) treating cellulosic materials such as wood pulp, cotton, cotton linters, rayon, etc., with carboxyalkylating reactants such as chloroalkanoic acids, preferably monochloroacetic acid, and an alkali, such as sodium hydroxide, in the presence of an alcohol, such as propanol, to form water-soluble carboxyalkyl cellulose having an average degree of substitution (D.S.) greater than 0.35 and up to about 1.4 or more carboxyalkyl radicals per anhydroglucose unit in the cellulose, but possessing poor liquid absorptive and retentive properties and characteristics; (2) removing a portion of the carboxyalkylating reactants and by-products, residues, and impurities formed during the reaction so that there remains at least about 3 or 4 percent and preferably less than about 50 percent by weight thereof, based on the weight of the water-soluble carboxyalkyl cellulose; and (3) heat-treating the carboxyalkyl cellulose in the presence of the remaining carboxyalkylating reactants and by-products, residues and impurities formed in the reaction whereby it becomes water-insoluble and possesses excellent liquid absorptive and retentive properties and characteristics.

12 Claims, No Drawings

WATER-INSOLUBLE FLUID-ABSORPTIVE AND RETENTIVE MATERIALS AND METHODS OF MAKING THE SAME

The present invention relates to water-insoluble, fluid-absorptive and retentive carboxyalkylated cellulosic materials and to methods of making the same of particular use in the manufacture of fluid absorptive and retentive products such as catamenial or other tampons, sanitary napkins, dental rolls, and other intracorporeal body exudate and fluid-absorptive and retentive articles of manufacture such as diapers, surgical dressings, hospital underpads, sponges, bandages, etc.

Cotton, cotton linters, rayon, wood pulp, and similar natural and synthetic cellulosic materials have long been used extensively in the preparation of fluid-absorptive and retentive materials and they have been found satisfactory for many purposes. However, many other materials have long been studied and have long been considered as possible replacements or improvements for such cellulosic materials.

Various carboxyalkyl ethers of cellulose, notably carboxymethyl cellulose, have long been considered and in some fields have been suggested for fluid absorption and retention purposes. For example, U.S. Pat. No. 3,005,456, which issued Oct. 24, 1961, discloses the use of carboxyalkyl cellulose, notably carboxymethyl cellulose and carboxyethyl cellulose, particularly for catamenial tampons. However, it is to be noted that the use of such carboxyalkyl ethers of cellulose is normally limited to those having a maximum average degree of substitution (D.S.) of about 0.35 carboxyalkyl radicals per anhydroglucose unit in the cellulose. Beyond that degree of substitution, the carboxyalkyl cellulose tends to become too water-soluble in its properties and the fluid absorption and retention properties and characteristics fall off to an extremely low, undesirable value.

It is believed that water-soluble carboxymethyl cellulose, having an average D.S. greater than 0.35, upon being contacted by fluid, quickly becomes surface-wetted, swells rapidly, and agglomerates or cakes into a gel-like mass. This gelling is at the outermost surface portions of the carboxymethyl cellulose and delays or perhaps completely blocks further access of fluid to the innermost portions of the carboxymethyl cellulose whereby very little additional fluid absorption is accomplished in a reasonable period of time.

In related, co-pending, commonly-assigned patent application Ser. No. 797,791, filed Feb. 10, 1969, now abandoned, there is described the discovery that, if a water-soluble carboxyalkyl ether of cellulose, such as carboxymethyl cellulose, is given a controlled heat treatment at selected elevated temperatures and for specified durations of time, the carboxymethyl cellulose is modified, becomes water-insoluble, and possesses excellent fluid absorption and retention properties for all degrees of substitution without showing any tendency toward agglomeration, caking, gelling, or blockage of wicking. As a result, carboxymethyl cellulose having degrees of substitution of 0.40, 0.70, 1.00, 1.30, 1.40 and higher, has been found to be extremely well suited for fluid absorption and retention purposes.

The first part of the procedures described in the related, previously-filed patent application comprise methods of making the carboxyalkyl ethers of cellulose, which methods are generally described in greater particularity in the scientific literature. The patent application specifically refers to one pertinent publication "Carbohydrate Chemistry," by R. L. Whistler, Vol. III, (Cellulose), pages 322–327, Academic Press, Inc., (1963) which describes methods of converting cellulosic materials, notably cotton linters, into carboxymethyl cellulose by reaction with chloroacetic acid and aqueous sodium hydroxide in a propanol solution.

Although carboxymethyl cellulose is available commercially, usually in powdered or fibrous forms, in degrees of substitution up to only about 1.4 at the present time, such is a preferred area and is not intended to limit the application of the principles of the present invention which are equally applicable to carboxymethyl cellulose having degrees of substitution up to 2.50 and 2.77, as described in the publication by Whistler.

Upon the conclusion of the carboxymethylation, rather extensive and elaborate steps previously were resorted to in order to recover the water-soluble carboxymethylated cellulosic materials from the reaction mixture. Such steps include the draining and filtering of the carboxymethylated cellulose, followed by stirring in an organic solvent alcohol such as methanol with the addition of sufficient organic acid such as acetic acid to neutralize the excess alkali. A second draining, filtering and washing takes place, followed by another stirring in an organic solvent alcohol such as methanol, and still another draining, filtering and washing. At this point, the carboxymethylated cellulose is usually treated in Soxhlet extraction apparatus employing methanol as the organic extraction solvent for many hours and the purified residue is finally drained, filtered and dried.

The carboxymethylated cellulosic materials are then exposed to heat-treating, as described in the patent application, and become water-insoluble and possess excellent fluid-absorptive and retentive properties and characteristics.

It has now been surprisingly discovered that the carboxyalkylated cellulosic materials, at the conclusion of the carboxyalkylating step, need not necessarily be subjected to such extensive and elaborate recovery and purification procedures at that time but may be simply drained and filtered to remove only a portion of the carboxyalkylating reactants and residues, impurities and by-products formed during the reaction so that there remains at least about 3 or 4 percent and preferably less than about 50 percent by weight thereof, based on the weight of the carboxyalkylating cellulosic materials, and the subsequent heat-treating step may than place directly in such impure materials with improved results. At the conclusion of the heat-treating step, washing with water is possible at room temperature rather than with organic solvents.

It has been surprisingly discovered that, if at least about 3 or 4 percent by weight and preferably less than about 50 percent by weight of the carboxyalkylating reactants, residues, impurities or reaction by-products, based on the weight of the carboxyalkylated cellulosic materials, are present during the heat-treatment, that a catalytic or reaction accelerating action takes place whereby the heating time required to bring about water-insolubility of the carboxyalkylated cellulosic materials is drastically reduced. Additionally, it is observed that increased degrees of carboxyalkyl substitution are attained, increased numbers of cross-linkages are formed between the carboxyalkyl substituted cellulose chains, along with improved color and brightness in the final product, as well as functional superiority in fluid absorbent and retentive uses. And, finally, it has been noted that the modified fibers retain a better fibrous character in water than previously known modified fibers.

It has also been discovered that sheet formation with the heat-treated carboxyalkylated cellulosic fibers of the present invention is much simpler and potentially less expensive than with previously known heat-treated carboxyalkylated cellulosic fibers. This is primarily so because the fibers are cross-linked prior to the washing step and do not require a washing with a non-aqueous solvent. Furthermore, the fibers of the present invention show less tendency to harden or to hornify.

With regard to the fibrous cellulosic starting materials, wood pulp, cotton, cotton linters, rayon, or other fibrous cellulosic materials derived from flax, sisal, hemp, ramie, jute, etc., are of use. Wood pump is the preferred species, primarily for economic and practical reasons, and will be used in describing the inventive concept in greater detail. Such, however, is primarily for illustrative purposes and is not to be construed as limitative of the broader aspects of the inventive concept.

Although the invention will be described with special emphasis on carboxymethyl cellulose as the fluid absorption and retention material in a specific product, namely, a catamenial tampon, such is done for illustrative purposes and the broader aspects of the invention are not to be construed as limited thereto but are to be considered equally applicable to other articles of manufacture mentioned herein as well as to other ethers of cellulose such as carboxyethyl cellulose, carboxymethyl hydroxyethyl or other cellulose ethers containing the carboxyalkyl radical or, more precisely, as will be pointed out hereinafter, the sodium salts thereof. As used herein, the acid form and the salt form are frequently used loosely and interchangeably and the state of the particular form in question must be determined from the nature and state of its chemical environment.

The idealized structural formula for carboxymethyl cellulose is as follows, showing a degree of substitution of 1.0:

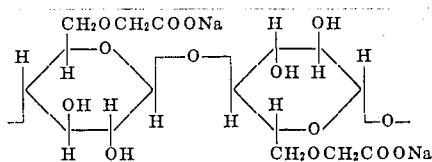

The idealized structural formula for carboxyethyl cellulose is as follows, showing a degree of substitution of 1.0:

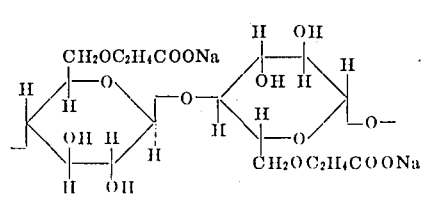

Carboxyethyl cellulose is obtained by basically the same mechanism as is used for carboxymethyl cellulose except that monochlorpropionic acid and sodium hydroxide is used rather than monochloracetic acid and sodium hydroxide.

The structural formula for carboxymethyl hydroxyethyl cellulose is as follows, showing a degree of substitution of 0.5 for carboxymethyl and 0.5 for hydroxyethyl:

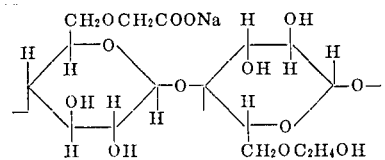

Carboxymethyl hydroxyethyl cellulose is prepared by carrying out the hydroxyethylation reaction first, and then following with the carboxymethylation reaction second.

Consideration of the above structural formulas will indicate that, although the terms "carboxymethyl cellulose," "carboxyethyl cellulose" and "carboxymethyl hydroxyethyl cellulose" are used herein, a more precise but lengthier term should include a reference to the fact that they are commercially available and more normally used as the sodium salt of such chemical compounds. Other alkali metal salts which are not as commercially available but which are equally applicable are the potassium, lithium, rubidium, and cesium salts.

Carboxymethyl cellulose is normally prepared by the reaction of cellulose with an alkali metal hydroxide such as sodium hydroxide whereby alkali cellulose is formed, which reacts with a chloroalkanoic acid such as monochloroacetic acid to form the carboxymethyl cellulose. The process is normally effected with an excess of alkali so that the alkali metal salt of the carboxymethyl cellulose is obtained. By-products in the process are sodium chloride, sodium chloroacetate which is in equilibrium with its acid form, monochloroacetic acid, excess alkali, and sodium glycolate which is in equilibrium with its acid form, glycolic acid.

Since the final reaction mixture contains a water-soluble product, namely, sodium carboxymethyl cellulose, filtering and washing with water or other aqueous media is out of the question. Instead, extensive and elaborate washing with organic solvents, notably alcohols such as methanol and propanol, are employed. Such processes are described in greater particularity in "Carbohydrate Chemistry" which has been previously identified. Such repeated drainings, stirrings, filterings, washings, and extractions with organic solvents are expensive, time consuming and, of course, highly undesirable. Nevertheless, however, it has always been deemed necessary to do so prior to any subsequent processing such as a heat treatment to attain water-insolubility.

According to the present inventive concept, at the conclusion of the carboxymethylation step, the reaction mixture is drained and filtered, preferably through high porosity filter paper on a Buechner funnel under suction. This should be carried out in such a way that only a portion of the carboxymethylating reactants and residues and impurities and by-products formed in the reaction is removed, leaving at least about 3 or 4 percent but preferably less than about 50 percent by weight thereof, based on the weight of the carboxymethyl cellulose.

It is believed that the carboxymethylating reactants, residues, impurities and reaction by-products which remain in the carboxymethyl cellulose act as a catalyst or as an accelerator during the subsequent heat treatment and drastically reduce the heating time required to bring about water-insolubility; effectively increase the degree of carboxymethyl substitution in the cellulose and the number of cross-linkages formed between the carboxymethyl substituted cellulose chains; improve the color and brightness of the final product; and enhance its functional superiority in fluid absorptive and retentive uses.

The amount of the carboxyalkylating reactants and reaction by-products which are permitted to remain in the carboxyalkylated cellulose is controlled during the draining and the filtration on the Buechner funnel primarily by adjusting and controlling the suction used during the filtration.

Inasmuch as the sodium chloride, sodium chloroacetate, monochloroacetic acid, excess alkali, sodium glycolate and glycolic acid are basically soluble and are primarily in solution, the preponderance of such materials will pass through the Buechner funnel during the filtration.

However, there will be a controllable amount of solution which remains absorbed on the carboxyalkylated materials at the conclusion of the filtration and such solution contains the necessary catalysts or accelerators in the desired amounts.

Less than about 4 percent weight of such catalytic materials, and down to about 3 percent, based on the weight of the carboxyalkylated materials, may be employed and may be attained by the use of very high suction. Such amounts are of use in the heat-treating and cross-linking reaction but normally such catalysis or acceleration action is relatively slow and it is preferred that at least 4 percent of such catalytic or accelerating materials be available.

On the other hand, if more than about 50 percent by weight of such catalytic or accelerating materials is present and such may be accomplished by the use of low suction, there will be also a large amount of absorbed solution which is undesirable inasmuch as it must be heated for a longer period of time for the greater amount of liquid to be driven off before the catalytic effect takes place at a more elevated temperature.

Therefore, more than about 3 or 4 percent but less than about 50 percent represents the economic and practical limits for the catalytic materials.

From the available information and based on a study of the reaction, it is believed that one of the by-products of the carboxymethylation reaction, namely, glycolic acid, which is in equilibrium with its salt form, namely, sodium glycolate, is reacting with the sodium carboxymethyl cellulose, thus resulting in more rapid cross-linking and an increase in the number of cross-linkages between the carboxymethyl substituted cellulose chains. In the carboxyethylation reaction, the residue of the chloropropionic acid acts in similar fashion.

The heat treating to insolubilize the carboxyalkylated materials normally takes place in two stages: (1) a heating at a temperature of about 100° C. (212° F.) for a period of from about 10 minutes to about 20 minutes to drive off solvent alcohol and water absorbed on the carboxyalkylated materials; and (2) a heating at a temperature of from about 120° C. (248° F.) to about 195° C. (383° F.) for a period of time of from about 2½ hours to as little as about 1 minute or even less than 1 minute. At a preferred operating temperature of 160° C. (320° F.), the time required is about 10 minutes. This is to be contrasted with prior heat treating which required about 20 hours at a temperature of 120° C. (248° F.), about 2 hours at a temperature of 160° C. (320° F.), 1 hour at about 170° C. (338° F.), and about 15 minutes at a temperature of about 195° C. (383° F.) for materials such as cotton linters which are easier to carboxyalkylate. For materials such as wood pulp fibers which require more cross-linkages after carboxymethylation in order to attain water insolubility but which are preferred for economic reasons, the corresponding times under previously known procedures are: 72 hours for 120° C. (248° F.), 4½ hours at 160° C. (320° F.), 2¼ hours at 170° C. (338° F.), and 25 minutes at 195° C. (383° F.). These values are set forth in the following Table I.

TABLE I

| Temp. C°. | Prior Art (Cotton Linters) | Prior Art (Wood Pulp) | Improved Process (Wood Pulp) |
| --- | --- | --- | --- |
| 120° C. | 20 hours | 72 hours | 2½ hours |
| 160° C. | 2 hours | 4½ hours | 10 minutes |
| 170° C. | 1 hour | 2¼ hours | 5 minutes |
| 195° C. | 15 minutes | 25 minutes | 1 minute |

Pressure may be employed during the heat treatment whereby the temperature and time factors are changed accordingly, as is well known in the art.

The most notable change is that the carboxymethyl cellulose, subsequent to the heat treatment, becomes water-insoluble, and although it does well swell water several hundred percent, it does so without developing the characteristic slippery feeling of wetted, untreated carboxymethyl cellulose. Both the untreated and heat-treated carboxymethyl cellulose are soluble in 6 percent sodium hydroxide solution. The browning temperature of the heat-treated carboxymethyl cellulose remains in the range of about 226°–228° C. and the charring temperature also is not materially changed from the original range of about 252°–253° C. for the untreated form. The specific gravity of the heat-treated carboxymethyl cellulose is about 1.59 grams/milliliter.

The resulting heat-treated materials, whether fibrous or powdered, whether compressed or uncompressed, when treated with water at room temperature, show tremendous amounts of water absorption and retention, along with excellent swelling, but without demonstrating the least agglomeration, gelling, caking or blockage of wicking.

When 0.8 D.S. fibrous carboxymethyl cellulose, for example, is used, the heat-treated material, when treated with water at room temperature, does not lose its fibrous characteristics, even though it swells several hundred percent. The swelled mass does not possess the characteristic slippery or gelatinous feeling noted in untreated carboxymethyl cellulose of a similar degree of substitution, when treated with water at room temperature.

When the heat-treated carboxymethyl cellulose (0.8 D.S.) is powdered and dropped into water at room temperature, it completely disperses substantially immediately (about 1 second). When similar 0.8 D.S. carboxymethyl cellulose which has not been heat-treated is powdered and dropped into water at room temperature, it remains undispersed, presumably because of the blocking effect of the surface formation of gel in contact with the water. Gradually, however, the untreated carboxymethyl cellulose dissolves in the water to form a gel-like mass.

Compressed pads made from the heat-treated 0.8 D.S. carboxymethyl cellulose, when dropped into water at room temperature show extremely high absorption and wicking. Compressed pads made from 0.8 D.S. carboxymethyl cellulose which has not been heat-treated and dropped into water at room temperature do not wick any water because of gel formation on the outer portions thereof which blocks further wicking.

Although the exact mechanism of the modification of the carboxyalkyl cellulose has not been completely proved beyond doubt, it is believed that there is some degree of internal esterification taking place between the carboxylic radicals of the carboxyalkyl group and the remaining unreacted hydroxyl groups of the main cellobiose unit or anhydroglucose unit. As such, it may be generally classified as a cross-linking, internal esterification between adjacent chains of the repeating cellobiose units or anhydroglucose units.

The structural formula for a typical unit of such a cross-linked internally esterified carboxymethyl cellulose (average D.S. = 1.0) is believed to be as follows, with each anhydroglucose unit illustrated being derived from separate polymer chains.

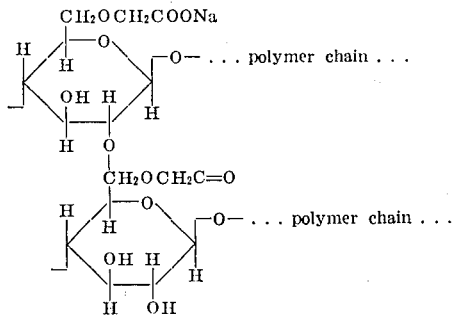

Another possibility is the formation of the following structure, containing glycolide and polyglycolide cross-linkages, as follows:

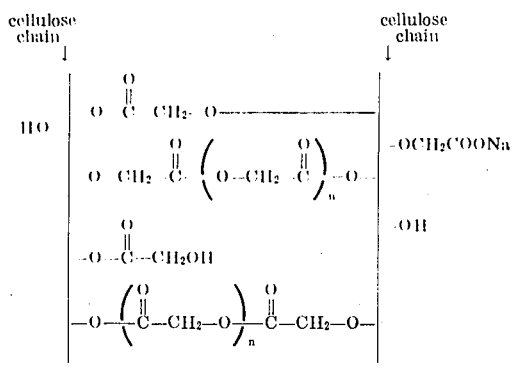

In this structural formula, $n$ is equal to or is greater than 1. Inasmuch as the polymerization of glycolic acid to form polyglycolide is known, it is very likely that $n$ is higher than 1, and perhaps of the order of about 3 or 5.

In the event that chloropropionic acid is used in the carboxyalkylating reaction instead of the chloroacetic acid, the cross-linkages will change and will have the above basic structural configuration with the exception that the $-CH_2-$ radicals in the cross-linkages are replaced by $-C_2H_4-$ radicals.

In this structural configuration, as well as in the immediately preceding structural configuration, all linkages of the oxygen atoms at the ends of the cross-linkages are to carbon atoms of the main cellulose chain. As a result, it is to be appreciated that the glycolide or other linkages actually comprise an ester linkage on one side (the right hand side for the top linkage in the immediately preceding structural configurations) and an ether linkage on the other side (the left hand side for the top linkage in the immediately preceding structural configurations).

Not to be ignored, however, is the lesser possibility that there is an anhydride formation between adjacent carboxylic groups, leading to a cross-linking condensation reaction between adjacent chains. This, however, is a less likely possibility.

The invention will be described in greater detail by reference to the following examples and tables wherein specific embodiments of the invention are set forth for illustrative but not for limitative purposes.

EXAMPLE I

Ninety grams of ground wood pulp fibers (bleached, southern pine, Kraft) is dispersed with stirring at 2,400 ml. of isopropanol. To this slurry, 240 ml. of 23 percent aqueous sodium hydroxide is added slowly with stirring at room temperature over a period of 30 minutes. One hundred and eight grams of monochloroacetic acid is then added slowly with stirring over a period of 30 minutes.

The slurry is then heated at a temperature of 55° C. (131° F.) for a period of 4½ hours. The slurry is then filtered through high porosity filter paper on a Buechner funnel using suction.

There is approximately 130 grams of carboxymethylated wood pulp fibers and about 6.5 grams of carboxymethylating reagents, residues, impurities and by-products in the filtered residue in the Buechner funnel. This represents 5 percent, based on the weight of the carboxymethylated wood pulp fibers.

These materials are spread on a tray and treated by a two-stage heating process: (1) at 100° C. for 15 minutes to drive off solvent propanol and water; and (2) at 160° C. for 10 minutes to achieve the desired cross-linking, increased carboxymethylation, and concomitant improved physical and chemical properties and characteristics.

The cross-linked wood pulp fibers are transferred to a Buechner funnel and washed thoroughly with water and then dried in an oven at a temperature of 100° C. The resulting fibers are swellable but insoluble in water and have a degree of substitution between 0.7 and 0.8. The color and brightness of the fibers is excellent. When incorporated in catamenial tampons, the fluid absorptive and retentive properties and characteristics of the fibers are excellent.

EXAMPLES II AND III

The procedures of Example I are followed substantially as set forth therein with the exception that the heat treatment to insolubilize the carboxymethylated wood pulp fibers takes place at a temperature of (A) about 170° C. (338° F.) for 5 minutes or (B) about 150° C. (302° F.) for 20 minutes. The results are generally comparable and the fibers have generally similar properties and characteristics to those obtained in Example I.

EXAMPLE IV

The procedures of Example I are followed substantially as set forth therein. Only 15 grams of ground wood pulp fibers, however, are used as the starting cellulosic materials and the reactants are reduced stoichiometrically. Sixty-four grams of material are collected on the Buechner funnel at the conclusion of the carboxymethylation procedure. This comprises: 22 grams of carboxymethyl cellulose fibers; 8 grams of solids as the catalytic material (36.4 percent, based on the weight of the carboxymethyl cellulose fibers); and 34 grams of solvent propanol and water which is evaporated during the first stage of the subsequent heating. The remaining procedures are then followed as set forth in Example I.

The results are generally comparable and the carboxymethylated, cross-linked wood pulp fibers have generally comparable physical and chemical properties and characteristics. They are well suited for inclusion in catamenial tampons.

EXAMPLE V

The procedures of Example I are followed substantially as set forth therein with the exception that the monochloroacetic acid is replaced by monochloropropionic acid whereby carboxyethyl cellulose wood pulp fibers are obtained rather than carboxymethyl cellulose wood pulp fibers. The filtering step and the cross-linking step are carried out substantially as set forth in Example I, yielding water-insoluble, cross-linked carboxyethyl cellulose fibers. Otherwise, the results are comparable and the cross-linked carboxyethyl cellulose fibers have excellent fluid absorptive and retentive properties and characteristics and are well suited for incorporation in catamenial tampons.

EXAMPLE VI

The absorptive capacity of the carboxymethylated, cross-linked wood pulp fibers of the present invention is evaluated in various blends with untreated wood pulp fibers in 1% sodium chloride solutions as follows:

| Proportion Blends | | Tampon Density grams/cc | Absorbency Capacity cc/gram |
|---|---|---|---|
| Untreated wood pulp | Treated wood pulp | | |
| 100 | control 0 | 0.4 | 2.55 |
| 90 | 10 | 0.4 | 3.55 |
| 80 | 20 | 0.4 | 4.16 |
| 70 | 30 | 0.4 | 4.85 |
| 60 | 40 | 0.4 | 5.32 |
| 50 | 50 | 0.4 | 5.72 |
| 100 | control 0 | 0.6 | 2.25 |
| 90 | 10 | 0.6 | 3.14 |
| 80 | 20 | 0.6 | 3.80 |
| 70 | 30 | 0.6 | 4.73 |
| 60 | 40 | 0.6 | 5.25 |
| 50 | 50 | 0.6 | 5.66 |

The improvement in absorptive capacity in 1 percent sodium chloride solutions due to increased percentages of the treated wood pulp fibers of the present invention is clear and unmistakable.

The results of this example are particularly meaningful inasmuch as carboxymethyl cellulose fibers are sensitive to salt whereas the untreated fibers are not. The improvement in absorptive capacity of the treated fibers will be even more magnified and significant if tested in water rather than in a salt solution.

EXAMPLES VII AND VIII

The procedures of Example I are followed substantially as set forth therein with the exception that the carboxymethylating reaction time is: (1) reduced to 3½ hours whereby the degree of substitution is reduced to about 0.6; (2) increased to 5½ hours whereby the degree of substitution is increased to about 0.9. All subsequent procedures continue as in Example I.

The color and brightness of the cross-linked carboxymethylated wood pulp fibers is excellent. They possess excellent fluid absorptive and retentive properties and characteristics.

EXAMPLE IX

The procedures of Example I are carried out substantially as described therein with the exception that the bleached, southern pine, Kraft, wood pulp fibers are replaced by bleached and unbleached hemlock, sulfite, wood pulp fibers. The results are comparable.

EXAMPLE X (Comparison Example)

Ninety grams of ground wood pulp fibers (bleached southern pine, Kraft) is dispersed with stirring in 2,400 ml. of isopropanol. To this slurry, 240 ml. of 23 percent aqueous sodium hydroxide is added slowly with stirring at room temperature over a period of 30 minutes. One hundred and eight grams of monochloroacetic acid is then added slowly with stirring over a period of 30 minutes.

The slurry is then heated at a temperature of 55° C. (131° F.) for a period of 4½ hours. The slurry is then filtered through high porosity filter paper on a Buechner funnel using suction.

The carboxymethylated wood pulp fibers are transferred from the Buechner funnel to a beaker and are then washed in 1,200 ml. of 70 percent methanol and stirred for 5 minutes. A sufficient amount of glacial acetic acid is then added with continued stirring to neutralize the excess alkali. The slurry is then re-filtered on a Buechner funnel.

The carboxymethylated wood pulp fibers are transferred again from the Buechner funnel to a beaker and stirred in 1,200 ml. of 70 percent methanol for 5 minutes and again filtered on a Buechner funnel.

The carboxymethylated wood pulp fibers are transferred to a Soxhlet extraction system containing absolute methanol and refluxed for 16 hours. The fibers are then removed from the Soxhlet extractor, filtered again on a Buechner funnel, and dried at room temperature. The fibers are substantially free of all carboxymethylating reactants, by-products formed in the reaction, and any other residual impurities.

The fibers are then spread on a tray and heated in an oven at 160° C. (320° F.) for 4½ hours.

The resulting product is insoluble but swellable in water and is carboxymethylated wood pulp fibers having an average degree of substitution between 0.6 and 0.7. This is lower than the degree of substitution achieved in Example I. The color and brightness of the fibers is satisfactory but not quite as good as those of Example I. The fibers also possess good fluid absorptive and retentive properties but not quite as good as those of Example I. The fibers, however, are acceptable for inclusion in catamenial tampons.

EXAMPLE XI (Comparison Example)

The procedures of Example X are followed substantially as set forth therein with the exception that the final heat treating to insolubilize the carboxymethylated wood pulp fibers takes place at 195° C. (383° F.) for 15 minutes. The results are generally comparable to those obtained in Example X, that is, the fibers are acceptable for inclusion in catamenial tampons but they do not possess the superior fluid absorptive and retentive properties and characteristics of the fibers of Example I, nor do they possess as good a color or brightness. EXAMPLE XII The color of the product of Example I (invention product) was compared with the color of the product of Example X (comparison product). The product of Example I (invention product) was white in all cases. The product of Example X (comparison product) was very light brown in 33 percent of the cases and light brown in 67 percent of the cases.

EXAMPLE XIII

The percent of treated wood pulp fibers required in blends with untreated wood pulp fibers to equal the absorptive capacity of wet cross-linked rayon fibers is determined to be as follows:

Only 22 percent of the product of Example I (invention product) is required at tampon densities of 0.4 and 0.6 grams per cc.

A larger amount, 37 percent and 36 percent of the product of Example X is required at tampon densities of 0.4 and 0.6 grams per cc., respectively.

It is not essential that the absorbent bodies contain only heat-treated carboxyalkyl cellulosic materials. In fact, in many cases, it is preferred that blends of the carboxyalkyl cellulose and other absorbent fibers or materials be used. Such other absorbent fibers or materials may be included in percentages as low as about 1 percent by weight or as high as about 99 percent by weight, with preferred ranges from about 5 percent to about 95 percent by weight. Other fibers and other materials which can be included are cotton, rayon, wood pulp, comminuted tissue or other paper, etc.

If desired, other materials and other fibers, not necessarily fluid absorbent, may be added in similar percentages by weight (as noted in the preceding paragraph) to obtain special characteristics and properties. Such other materials and other fibers include, for example, untreated carboxymethyl cellulose, cellulose esters such as cellulose acetate, polyamide fibers such as nylon 6, nylon 6/6, nylon 12, etc., polyester fibers such as Dacron, Kodel, etc., acrylic fibers such as Dynel, Orlon, etc. It is also contemplated that the heat-treated, modified carboxyalkyl cellulose may form a portion of a more complex absorbent structure. For example, it may be used as a concentrically, centrally located core member of a catamenial tampon and be surrounded by a cylindrical sheath of other absorbent fibers or materials. Or it may be used as a centrally located core of the absorbent body of a sanitary napkin or of a diaper or underpad. Or it may be used in a multi-layered, laminated structure with other materials or fibers.

Although the present invention has been described with reference to several examples and embodiments showing specific materials and specific products in specific arrangements and conformations, such is not to be considered limitative of the invention but merely illustrative thereof.

What is claimed is:

1. A method of making water-insoluble, fluid-absorptive and retentive carboxyalkylated cellulosic materials having an average degree of substitution greater than 0.35 carboxyalkyl radicals per anhydroglucose unit in the cellulose which comprises:

1. treating cellulosic materials with carboxyalkylating reactants to form water-soluble carboxyalkyl cellulose having an average degree of substitution greater than 0.35 carboxyalkyl radicals per anhydroglucose unit in the cellulose but possessing poor liquid absorptive and retentive properties and characteristics;
   2. removing a portion of the carboxyalkylating reactants and by-products formed during the reaction so that there remains at least about 3 percent by weight but not more than 50 percent by weight thereof, based on the weight of the water-soluble carboxyalkyl cellulose; and
   3. heat-treating the carboxyalkyl cellulose in the presence of the remaining carboxyalkylating reactants and reaction by-products whereby it becomes water-insoluble and possesses excellent liquid absorptive and retention properties.

2. A method as defined in claim 1 wherein the carboxyalkyl radical is carboxymethyl.

3. A method as defined in claim 1 wherein the carboxyalkyl radical is carboxyethyl.

4. A method as defined in claim 1 wherein the carboxyalkyl cellulose is carboxymethyl hydroxyethyl cellulose.

5. A method as defined in claim 1 wherein the cellulosic materials are wood pulp fibers.

6. A method as defined in claim 1 wherein the degree of substitution is greater than 0.35 and is up to about 1.4.

7. A method as defined in claim 1 wherein the water-insoluble, heat-treated carboxyalkylated cellulose is washed with water at the conclusion of the heat-treating step to remove residues, impurities and reaction by-products.

8. Cross-linked carboxyalkylated cellulose having a carbon atom of one anhydroglucose unit linked to a carbon atom of another anhydroglucose unit through a radical having the structure:

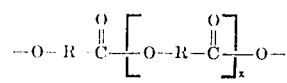

wherein, R is chosen from the group consisting of $CH_2$ and $C_2H_4$, and X is at least 1.

9. The cross-linked carboxyalkylated cellulose of claim 8 wherein the carboxyalkyl group consists of from two to three carbon atoms.

10. The cross-linked carboxyalkylated cellulose of claim 9 wherein said linking radical has the structure:

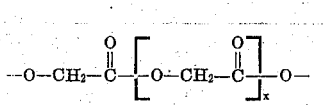

and X is at least 1.

11. The cross-linked carboxyalkylated cellulose of claim 9 wherein said linking radical has the structure:

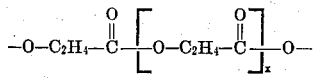

and X is at least 1.

12. The cross-linked carboxyalkylated cellulose of claim 8 wherein the carboxyalkylated cellulose is carboxymethyl hydroxyethyl cellulose.

* * * * *